W. S. NORVELL.
PLANTER AND FERTILIZER DISTRIBUTER.
APPLICATION FILED SEPT. 9, 1911.
1,066,310. Patented July 1, 1913.
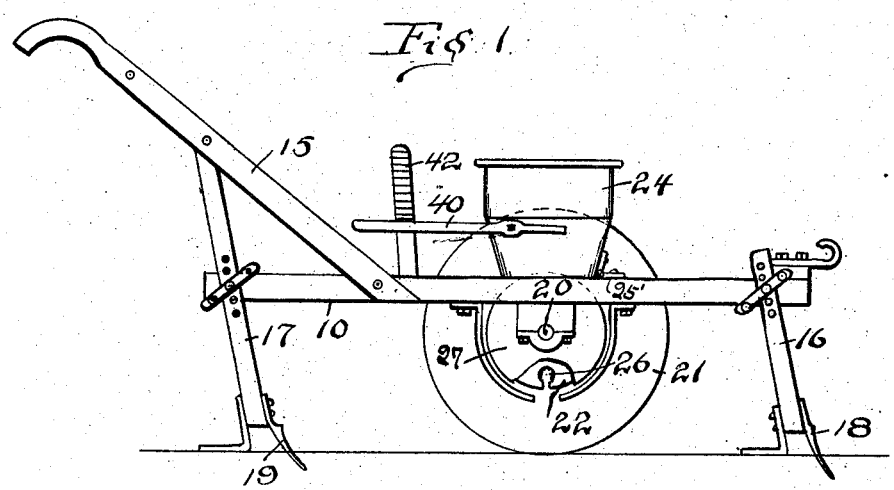
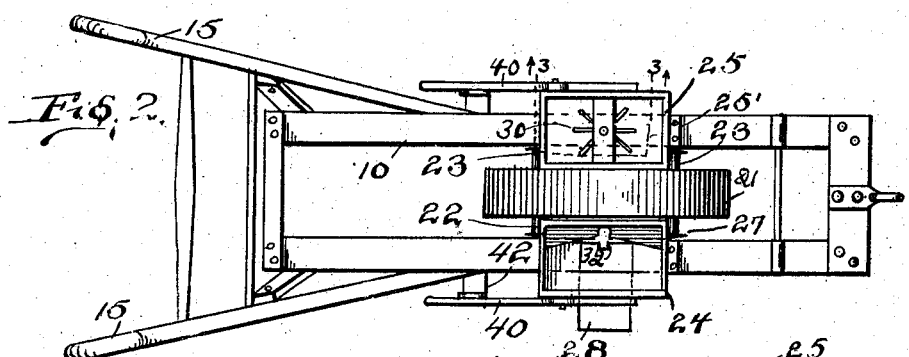
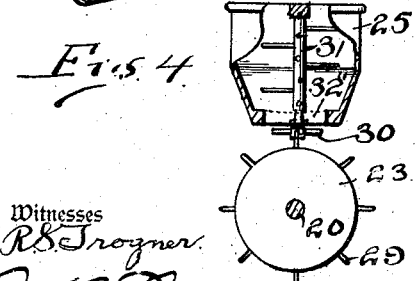
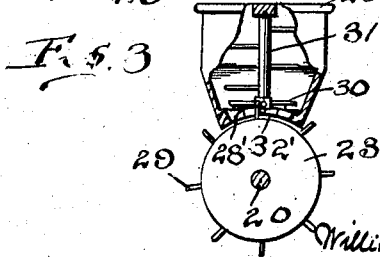
Witnesses
Inventor
William S. Norvell
By Beall and Fenwick Attorneys

UNITED STATES PATENT OFFICE.

WILLIAM SETLIFF NORVELL, OF POYNER, TEXAS.

PLANTER AND FERTILIZER-DISTRIBUTER.

1,066,310.   Specification of Letters Patent.   Patented July 1, 1913.

Application filed September 9, 1911. Serial No. 648,464.

*To all whom it may concern:*

Be it known that I, WILLIAM SETLIFF NORVELL, a citizen of the United States, residing at Poyner, in the county of Henderson and State of Texas, have invented certain new and useful Improvements in Planters and Fertilizer-Distributers, of which the following is a specification.

This invention relates to planters and fertilizer distributers, and it consists in certain improvements, hereinafter set forth, in the construction of the hopper and in the mechanism for receiving the seed and fertilizer and distributing the same.

In the accompanying drawings forming a part of this application, Figure 1 is a view of the device in side elevation, Fig. 2 is a top plan view, Fig. 3 is a view partly in elevation and partly in section on line 3—3 of Fig. 2. Fig. 4 is a view of another form of the device for distributing fertilizer.

In carrying out my invention, I provide a framework of ordinary or any preferred form designated in the drawings by the numeral 10, such framework having connected thereto the usual handles 15 and also having at the front and rear ends standards 16 and 17 which may carry cultivating members 18 and 19 on the lower ends thereof. A shaft 20 is mounted transversely of the framework and carries a main wheel 21 located approximately in the central portion of the framework. On either side of wheel 21 is a distributing device, and in Fig. 2 I have shown on one side a distributer 22 for the seed and on the opposite side of wheel 21 a distributer 23 for fertilizer. These devices 22 and 23 are mounted on the main shaft or axle 20. Hoppers 24 and 25 are hinged at 25' to the framework and are arranged to discharge their contents into slots, pockets or other receptacles provided in the said members 22 and 23. Levers 40 secured to the sides of the hoppers permit the lifting or tilting of the latter, and these levers are arranged to engage rack members 42 mounted on the frame.

The distributing device 22 consists of a wheel having pockets 26 which are somewhat narrower at the open ends, these pockets being designed to receive the seed and properly distribute it. Carried by shaft 20 and on the outer side of distributer 22 is a plate 27 for retaining the seed within the pockets. The hopper 24 is provided with a feed slide 28 in the lower portion thereof having a suitable feed slot 32 therein for permitting the discharge of seed from the hopper to the aforesaid pockets 26 in the distributing device. This slide 28 is movable for the purpose of closing the slot when it is desired to stop the distribution of seed, and has a curved bottom like slide 28' (shown in Fig. 3).

The fertilizer distributer 23 consists of a wheel mounted on main shaft 20 adjacent to the central wheel 21 and carrying spikes 29 which extend radially of the wheel and are designed to engage with the teeth 30 of an agitator 31 mounted within hopper 25. The slide 28' located at the lower end of hopper 25 is provided with a slot 32' through which the teeth 29 project and through which the fertilizer is drawn. A similar construction may be used for distributing both seed and fertilizer if desired. In Fig. 4 the lower members 30 are below the hopper. The slot is indicated by 32", the slide being removed.

What I claim is:—

1. In a device of the class described, a framework, a shaft mounted therein and transversely thereof, a furrow opener carried by the framework, a main wheel mounted on the aforesaid shaft, a distributing device mounted on said shaft and adjacent to one side of said wheel, pockets in the circumference of said distributing device, a plate mounted on the shaft and adjacent to the distributing device for retaining seed within the pockets, a fertilizer distributer mounted on the opposite side of said main wheel, said distributer including spiked members projecting radially therefrom, hoppers mounted above the distributing device, a vertically mounted shaft within one of the hoppers, teeth extending radially from the shaft and at an angle to the aforesaid spiked members, and at an angle to the direction of movement of the material fed through the hopper, said teeth being engaged by the spiked members.

2. In a device of the class described a framework, a furrow opener carried thereby, a main shaft mounted within the framework, a wheel centrally mounted therein, a distributing device carried by the main shaft and on one side of the wheel, said distributing device having pockets in the circumference thereof, a second distributing device on the opposite side of the wheel first mentioned and provided with spikes in its circumference, hoppers mounted above the distributing devices, a vertically mounted shaft within one of the hoppers, teeth extending radially from the shaft and at an angle to the aforesaid spiked members and at an angle to the direction of movement of the material fed through the hopper, said teeth being engaged by the spiked members, and a slide provided with a slot and adjustably mounted within the hopper first mentioned.

In testimony whereof I affix my signature in presence of two witnesses.

WILLIAM SETLIFF NORVELL.

Witnesses:
  W. H. FOSTER,
  F. M. ROBERTS.

Copies of this patent may be obtained for five cents each, by addressing the "Commissioner of Patents, Washington, D. C."